US009016938B2

(12) United States Patent
Yu

(10) Patent No.: US 9,016,938 B2
(45) Date of Patent: Apr. 28, 2015

(54) ELECTRONIC CONTACT THERMOMETER

(71) Applicant: Chu-Yih Yu, New Taipei (TW)

(72) Inventor: Chu-Yih Yu, New Taipei (TW)

(*) Notice: Subject to any disclaimer, the term of this patent is extended or adjusted under 35 U.S.C. 154(b) by 329 days.

(21) Appl. No.: 13/685,718

(22) Filed: Nov. 27, 2012

(65) Prior Publication Data
US 2014/0146851 A1 May 29, 2014

(51) Int. Cl.
*G01K 13/00* (2006.01)
*F03B 13/18* (2006.01)

(52) U.S. Cl.
CPC .......... *G01K 13/002* (2013.01); *F03B 13/1815* (2013.01); *F03B 13/1865* (2013.01); *F03B 13/1845* (2013.01); *F03B 13/1885* (2013.01)

(58) Field of Classification Search
CPC ..... G01K 13/002; G01K 1/024; G01K 15/00; G01K 1/14; G01K 7/01; G01K 1/02; G01K 1/026; G01K 1/028; G01K 1/08; G01K 1/083; G01K 1/16; G01K 1/165; G01K 1/18; G01K 2205/04; G01K 2215/00
USPC ......... 374/178, 100, 163, 185, 151, 170, 179, 374/165; 338/22 R, 28, 25
See application file for complete search history.

(56) References Cited

U.S. PATENT DOCUMENTS

| | | | | |
|---|---|---|---|---|
| 4,932,789 | A * | 6/1990 | Egawa et al. | 374/126 |
| 5,522,662 | A * | 6/1996 | Shiokawa | 374/130 |
| 6,572,264 | B1 * | 6/2003 | Egawa | 374/133 |
| 7,507,021 | B2 * | 3/2009 | Yerlikaya et al. | 374/142 |
| 8,545,097 | B2 * | 10/2013 | Bachmann et al. | 374/208 |
| 8,668,385 | B2 * | 3/2014 | Matsuo et al. | 374/208 |
| 8,814,428 | B2 * | 8/2014 | Chancy | 374/179 |
| 2007/0086508 | A1 * | 4/2007 | Reading et al. | 374/208 |
| 2011/0235677 | A1 * | 9/2011 | Tseng | 374/170 |
| 2011/0249701 | A1 * | 10/2011 | Bieberich et al. | 374/163 |
| 2014/0003462 | A1 * | 1/2014 | Roth | 374/121 |

* cited by examiner

*Primary Examiner* — Michael Zarroli

(57) ABSTRACT

An electronic contact thermometer with shorter reactive time, which comprises a case; a circuit board which is installed in said case; a display; a switch; a power supply device; and a sensing part which is installed in one end of said case. Electrically connected with said circuit board; said display and switch are disposed on one side of said case; said sensing part comprises a positioning nugget that is installed in the same end of said case that the sensing part is installed. A temperature sensing chip; and 2 conducting lines which are electrically connected to the temperature sensing chip. Said metallic contact part is a round cap with flat contacting surface, which comprises positioning sticks on the surrounding wall, which connect to said positioning rods for making it protruding from but not contact to said case.

8 Claims, 4 Drawing Sheets

ELECTRONIC CONTACT THERMOMETER

FIELD OF THE INVENTION

Present invention relates to an electronic contact thermometer, particularly to an electronic contact thermometer with a flat contacting sensing surface.

BACKGROUND OF THE INVENTION

The conventional thermometer applying on present market are mercury glass thermometer, electronic thermometer and infrared ear thermometer, conventional mercury glass thermometer has a risk of breaking in using, and the leakage of mercury may occurred and cause injury to the user, furthermore, the scale on the body of the thermometer is not easy to read, thus, electronic thermometer and infrared ear thermometer are developed, with solid plastic shell and digital display which is not only strong enough to overcome normal bump and hit in daily use, but the value is also easy to read, however, conventional electronic thermometer needs 3 to 5 minutes since start sensing to the number is shown on the screen, infrared ear thermometer needs less time, but the cost of production is expensive, besides, infrared sensor is easy to be interfered by air temperature, the material covers on the object, and the position of body for measuring, thus, the user of conventional infrared ear thermometer needs time to be familiar with the way of operation, and sometimes the inaccuracy or errors may be caused by the miss of personal operating, therefore, to provide a thermometer with shorter reactive time and more easy to use, have become a main issue of present invention.

SUMMARY OF THE INVENTION

Present invention provides an electronic contact thermometer comprises:
A case;
A circuit board which is installed in said case;
A display;
A switch;
A power supply device which is installed in one end of said case; and
A sensing part which is installed in one end of said case, electrical connected with said circuit board;
Said display and switch are disposed on one side of said case and electrical connected with said circuit board;
Said sensing part comprises:
A positioning nugget which is installed in the same end of said case that the sensing part is installed in;
A metallic contact part which is fixed on said positioning nugget;
A temperature sensing chip; and
2 conducting lines which are electrical connected to the temperature sensing chip;
Several positioning rods protruding from the surface of said positioning nugget;
Said metallic contact part is a round cap with flat contacting surface, which comprises several positioning sticks on the surrounding wall, which connect to said positioning rods for making metallic contact part protruding from but not contact to said case;
Said temperature sensing chip is disposed inside said metallic contact part;
Said conducting lines are connected with 2 ends of said temperature sensing chip, which are tangled and attached on the inside wall of said metallic contact part.

The central point of said positioning nugget is a hole for surpass of said conducting lines which connect to the circuit board.

Said case comprises a buzzer which is electrical connected to the circuit board for reminding user of present using status of the thermometer.

Said conducting lines are spiral, petal shaped or polygonal tangled on the inside wall of said metallic contact part.

Said power supply device is at least a battery.

The space between said temperature sensing chip and metallic contact part is 0.5 to 1 mm.

Said case is assembled by an upper case and a lower case;
Said upper case comprises an upper slot for fixing the upper part of said positioning nugget;
Said lower case comprises a lower slot for fixing the lower part of said positioning nugget.

One end of said case is surrounded by an annular jacket for decoration.

DETAIL DESCRIPTION OF THE INVENTION

Figure 1:
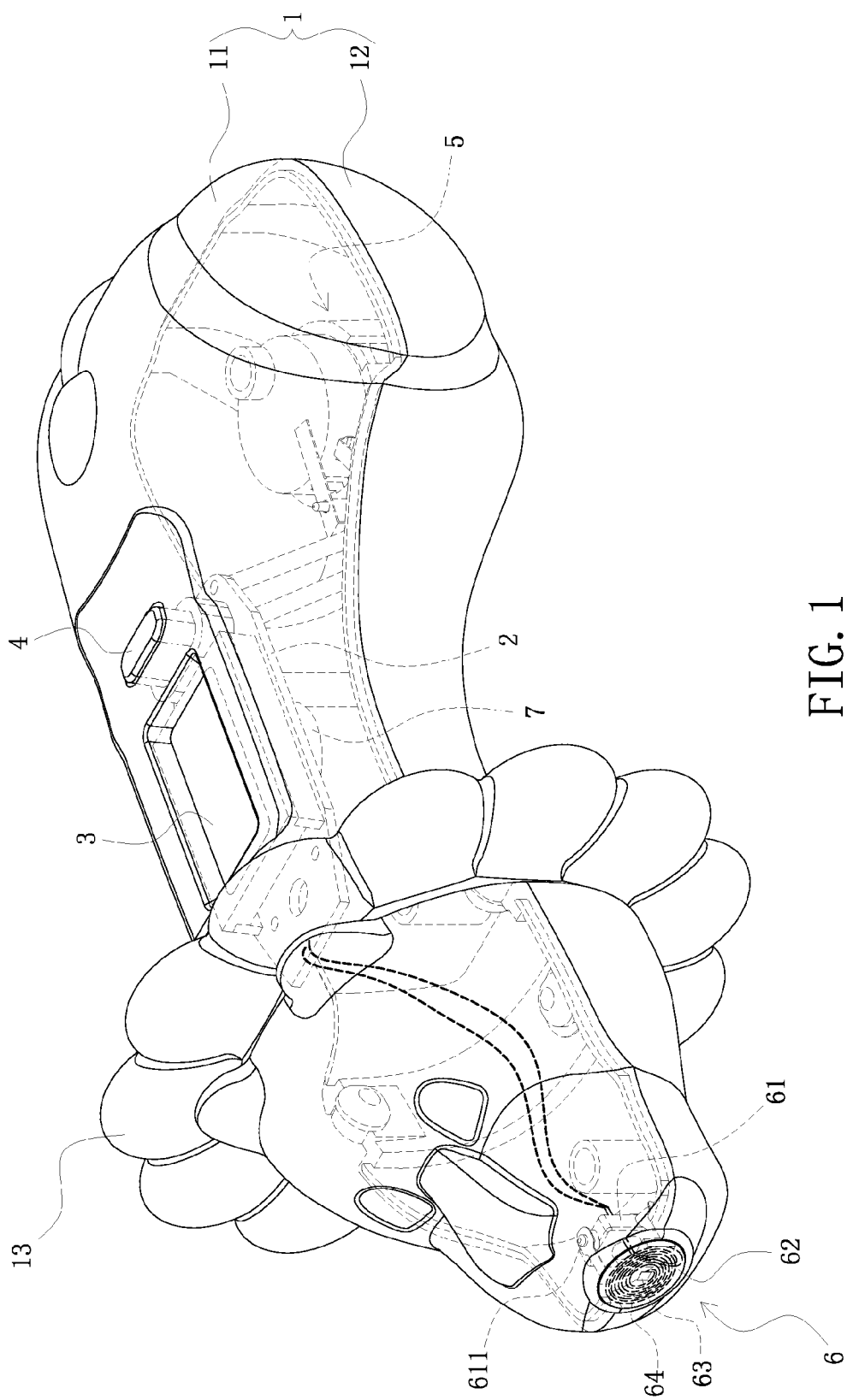
FIG. 1 is transparent view of present invention.
Figure 2:
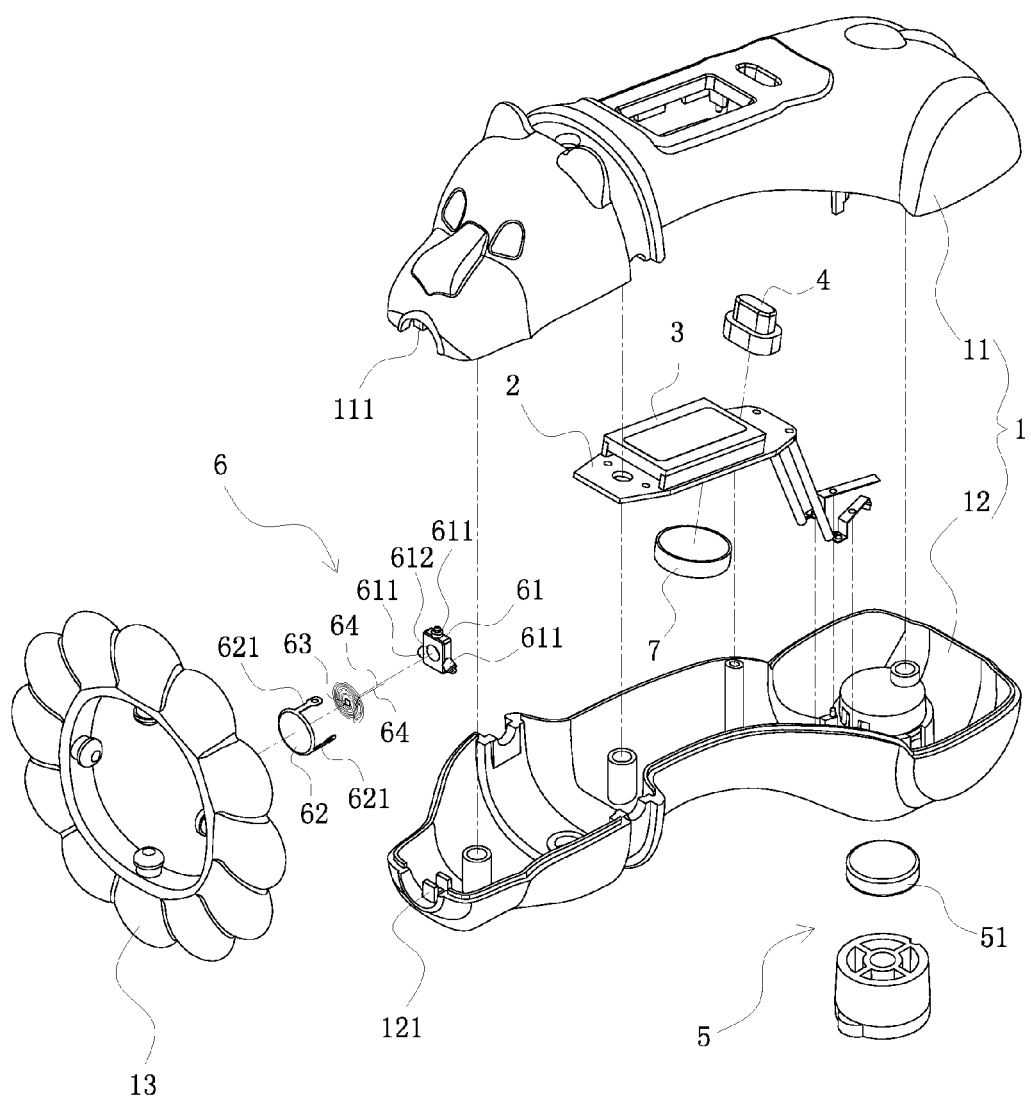
FIG. 2 is exploded view of present invention.
Figure 3:
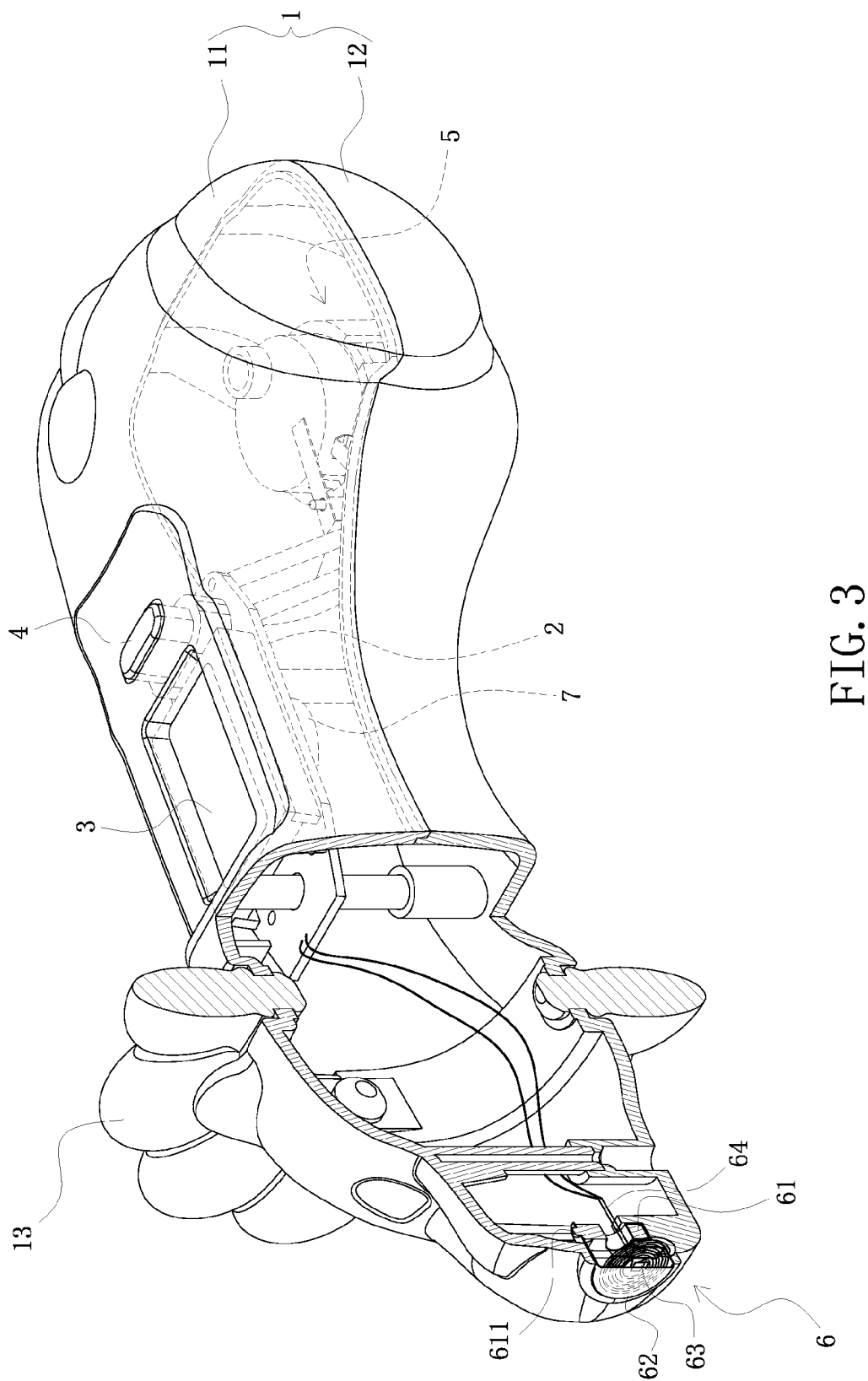
FIG. 3 is partial cross-section of present invention.
Figure 4:
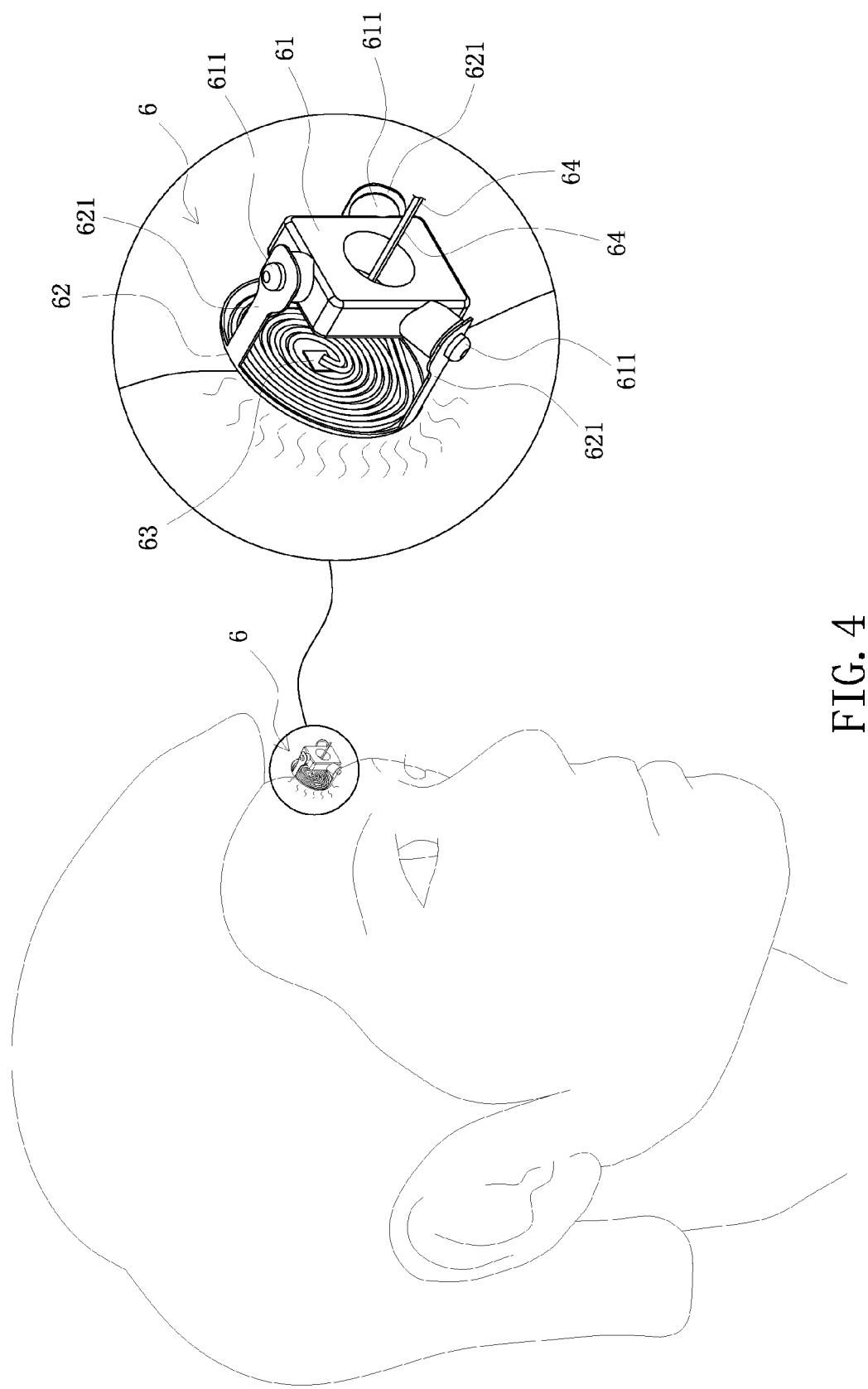
FIG. 4 is scheme of working principle of the sensing part.

Refer FIGS. 1-4, which reveal an electronic contact thermometer comprises:
A case 1;
A circuit board 2 which is installed in said case;
A display 3;
A switch 4;
A power supply device 5 which is installed in one end of said case 1; and
A sensing part 6 which is installed in one end of said case 1, electrical connected with said circuit board 2;
Said display 3 and switch 4 are disposed on one side of said case 1 and electrical connected with said circuit board 2;
Said sensing part 6 comprises:
A positioning nugget 61 which is installed in the same end of said case 1 that the sensing part 6 is installed in;
A metallic contact part 62 which is fixed on said positioning nugget 61;
A temperature sensing chip 63; and
2 conducting lines 64 which are electrical connected to the temperature sensing chip 63;
Several positioning rods 611 protruding from the surface of said positioning nugget 61;
Said metallic contact part 62 is a round cap with flat contacting surface, which comprises several positioning sticks 621 on the surrounding wall, which connect to said positioning rods 611 for making said metallic contact part 62 protruding from but not contact to said case 1;
Said temperature sensing chip 63 is disposed inside said metallic contact part 62;
Said conducting lines 64 are connected with 2 ends of said temperature sensing chip 63, which are tangled and attached on the inside wall of said metallic contact part 62.

When the contacting surface of said metallic contact part 62 of the sensing part 6 herein contacts to the surface of measured object, the heat from measured object is conducted through said metallic contact part 62 and sensed by said temperature sensing chip 63, in the meanwhile, an electronic signal is produced by said temperature sensing chip 63, and the signal travels through said conducting lines 64 to said circuit board 2, after signal transformation, the temperature value of measured object is shown by said display 3.

To compare with conventional electronic contact thermometer, the contact sensing area of present invention is larger, thus, present invention can use on most skin surface of body portion, and, due to said conducting lines 64 are closely tangled on the inside wall of said metallic contact part 62, and said temperature sensing chip 63 is disposed close to said metallic contact part 62 (the space between said temperature sensing chip 63 and metallic contact part 62 is 0.5 to 1 mm), the heat from measured object would be directly derived to said temperature sensing chip 63 and conducting lines 64 without separation, thus, the period of process from start measuring to the value is shown would be shorten to 5 to 6 seconds, which is much shorter than conventional electronic thermometer which needs 3 to 5 minutes to complete the whole process.

Secondary, by the connection between said positioning rods 611 and positioning sticks 621, the inside surface of said metallic contact part 62 do not contact with said positioning nugget 61, thus, the heat of hand derived to the case is not conducted to said metallic contact part 62 to influence the performance of said sensing part 6, therefore, the measuring accuracy of present invention is promoted.

The central point of said positioning nugget 61 is a hole for surpass of said conducting lines 64 which connect to the circuit board 2 to avoid the influence to the signal transmission caused by the shifting of outside temperature.

Said case 1 comprises a buzzer 7 which is electrical connected to the circuit board 2 for reminding user of present using status such as power on/off or start/finish of measuring process of present invention.

Said conducting lines 64 are spiral, petal shaped or polygonal tangled on the inside wall of said metallic contact part 62 (not reveal in Figures) to fit the requirement of said temperature sensing chip 63.

Said power supply device 5 is at least a battery 51.

By the application of said battery 51, makes present invention become portable, which is convenient for user to use in emergency or out of power condition.

Said case 1 is assembled by an upper case 11 and a lower case 12;

Said upper case 11 comprises an upper slot 111 for fixing the upper part of said positioning nugget 61;

Said lower case 12 comprises a lower slot 121 for fixing the lower part of said positioning nugget 61.

The design of the case 1 herein reduces the difficulty of assembling, which makes the cost of production become cheaper, the producing price of industrial production type of present invention is only 40% of the producing price of conventional infrared ear thermometer. Also, by the application of said upper slot 111 and lower slot 121, said positioning nugget 61 is locked without shaking or moving caused by bumping or moving in normal use, which may influence the accuracy of measuring.

One end of said case is surrounded by an annular jacket 13 for decoration, but also tightens the assembling between said upper case 11 and lower case 12.

Present invention is described but not limited in the description with drawings herein, which are only better embodiments of present invention, modifications and variations from the scope of present invention may be characterized in what is claimed hereafter.

I claim:

1. An electronic contact thermometer comprises:

A case;

A circuit board which is installed in said case;

A display;

A switch;

A power supply device which is installed in one end of said case; and

A sensing part which is installed in one end of said case, electrically connected with said circuit board;

Said display and switch are disposed on one side of said case and electrical connected with said circuit board;

Said sensing part comprises:

A positioning nugget which is installed in the same end of said case that the sensing part is installed in;

A metallic contact part which is fixed on said positioning nugget;

A temperature sensing chip; and 2 conducting lines which are electrical connected to the temperature sensing chip;

Several positioning rods protruding from the surface of said positioning nugget;

Said metallic contact part is a round cap with flat contacting surface, which comprises several positioning sticks on the surrounding wall, which connect to said positioning rods for making said metallic contact part protruding from but not contact to said case;

Said temperature sensing chip is disposed inside said metallic contact part;

Said conducting lines are connected with 2 ends of said temperature sensing chip, which are tangled and attached on the inside wall of said metallic contact part.

2. An electronic contact thermometer of claim 1, wherein the central point of said positioning nugget is a hole that provides for passage of said conducting lines which connect to the circuit board.

3. An electronic contact thermometer of claim 1, wherein said case comprises a buzzer which is electrical connected to the circuit board for reminding user of present using status of the thermometer.

4. An electronic contact thermometer of claim 1, wherein said conducting lines are spiral, petal shaped or polygonal tangled on the inside wall of said metallic contact part.

5. An electronic contact thermometer of claim 1, wherein said power supply device is at least a battery.

6. An electronic contact thermometer of claim 1, wherein the space between said temperature sensing chip and metallic contact part is 0.5 to 1 mm.

7. An electronic contact thermometer of claim 1, wherein said case is assembled by an upper case and a lower case;

Said upper case comprises an upper slot for fixing the upper part of said positioning nugget;

Said lower case comprises a lower slot for fixing the lower part of said positioning nugget.

8. An electronic contact thermometer of claim 7, wherein one end of said case is surrounded by an annular jacket for decoration.

* * * * *